Aug. 30, 1955 R. H. PRICE 2,716,426
MEANS FOR ACTUATING VALVES OR OTHER DEVICES
Filed July 31, 1950
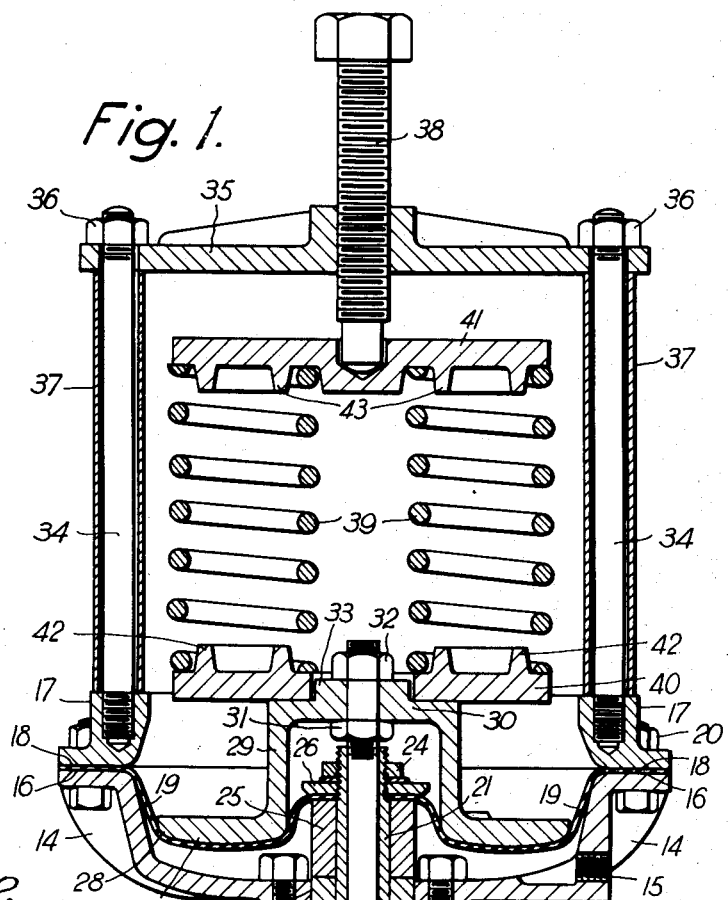
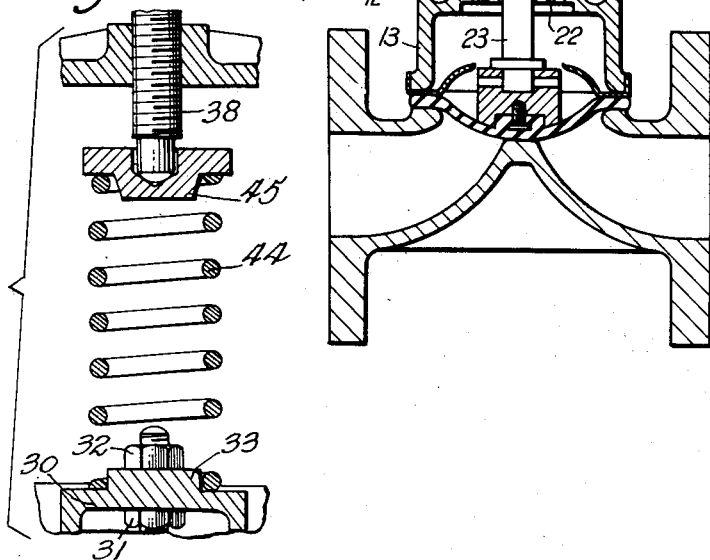
INVENTOR
Richard Hector Price
BY
ATTORNEY

United States Patent Office 2,716,426
Patented Aug. 30, 1955

2,716,426

MEANS FOR ACTUATING VALVES OR OTHER DEVICES

Richard Hector Price, Cwmbran, Newport, England, assignor to Saunders Valve Company Limited, Cwmbran, Newport, England, a British company Application July 31, 1950, Serial No. 176,817

4 Claims. (Cl. 137—784)

This invention relates to fluid-pressure operated means for actuating valves or other devices against spring pressure, whereby the movement can be precisely controlled by control of the fluid pressure; preferably the movement varying linearly with the pressure and this in both directions of movement. Usually means of this kind are operated by air pressure, and for convenience only air will be referred to hereinafter.

Means of this kind are well known, comprising an air-chamber the volume of which is made variable by making part of it flexible, generally in the form of a flexible diaphragm, spring means which bias the volume to its smallest size, and a link from the flexible part to the device to be actuated. Most conveniently the link is a rigid member carried from the flexible wall away from the air-chamber so that if the actuated device is a valve, the valve will be closed by the air pressure and opened by the spring means. In some cases however the reverse arrangement is required, i. e. opening by the air pressure and closing by the spring means. Known arrangements involve either the passage of the link through the air-chamber and therefore a stuffing box, or a somewhat complicated form of link such as a stirrup which is not very rigid; but in either case some accuracy of control is lost.

An object of the invention is to provide a reverse arrangement as described above, which is simple and accurate. Another object is to provide such an arrangement which will be suitable for actuating a diaphragm valve which, on account of the relatively high reaction of the line pressure, requires a relatively large air-chamber to actuate it satisfactorily.

According to the invention, the air-chamber is made of annular form so that the link can pass through its centre without packing, the flexible part constituting at least a part of an end of the chamber so that the movement of the flexible part can be transmitted to the link by an actuating plate bearing on this flexible part. Both the link and plate can readily be made rigid and rigidly secured together; and the link can in fact be the actual operating spindle of a valve. Preferably the plate engages the flexible part of the chamber over a substantial width.

The air chamber comprises a flexible annular diaphragm clamped at its inner and outer peripheries to a rigid air-chamber part. Preferably also the diaphragm is molded in a form in which the plate-engaging part is spaced axially from the clamped peripheries and the range of movement is such that its curvature is never reversed. This makes it possible to use a thin diaphragm with low forces in moving it and to avoid different characteristics in the two directions due to the effort necessary to flex and unflex the material of the diaphragm. Conveniently the diaphragm is molded in the shape appropriate to the smallest volume of the air-chamber as this gives the minimum over-all depth. The diaphragm may be of rubber and may be reinforced with fabric.

The invention will be further described with reference to the accompanying drawings in which:

Figure 1 is an axial section of one form in which the invention may be embodied.

Figure 2 is a detail view of a modification of Figure 1.

The diaphragm valve shown in Fig. 1 is itself of well known construction and requires no further description. In such valves the line reaction on the valve stem or spindle is high and accordingly strong springs and a large air-chamber are necessary. In the example shown, the rigid part of the air chamber is a dish bored to fit projection 12 on and bolted air-tight to the usual valve bonnet 13. The dish may be externally ribbed as at 14 to strengthen it. It has an air inlet 15 at a convenient point and a flat annular clamping face 16 around its periphery. A metal ring 17 has a flat face 18 to match the clamping face of the dish and the outer periphery of a diaphragm 19, shaped appropriately to the closed position shown of the valve, is clamped between the ring and dish which are held together by bolts such as 20.

A bushing 21 flanged at its lower end at 22 to retain it, protrudes through the bonnet projection or boss 12 with which it makes an air-tight joint, and serves to guide a valve spindle 23. At its upper end the bushing is threaded to receive a nut 24. The inner periphery of the diaphragm is clamped by the action of the nut, between the flat top face of a distance piece or spacer sleeve 25 fitting over the bushing and the flat, bevel-edged under-face of a washer 26 beneath the nut. When clamped, the inner periphery of the diaphragm may, as shown, be a little nearer the base of the dish than the outer periphery when the valve is closed.

An actuating plate 27, of annular form is slightly rounded on its under face with well rounded corners 28, and is integral with a central tubular part 29 which amply clears the washer 26 and the adjacent part of the diaphragm and this tubular part in turn terminates at a suitable level in a central disc 30 which fits over the valve spindle 23 and is locked thereto between two nuts 31, 32. There is a central boss 33 on the upper face of this central disc.

A number of pillars or long bolts 34, say two at diametrically opposite points, are screwed into the ring 17 and are joined by a bridge piece 35; the latter may be held by nuts 36 against tubular distance pieces or spacer sleeves 37 on the pillars or bolts 34. Through the center of bridge piece 35 and in line with the valve spindle 23 a bolt 38 is screw thread and the spring means has its abutment between this bolt and the central disc 30. Figure 1 shows the spring means in the form of a plurality of separate compression springs 39. Accordingly a plate 40 is located on the boss 33 and another plate 41 is located by a recess on the end of the bolt 38. These two plates have sets of opposite bosses 42, 43 symmetrically arranged about the central axis, by which the springs 39 are located.

In Figure 2 a single compression spring 44 is used. This is located at its lower end by the boss 33 and at its upper end by a collar 45 recessed to receive the end of the bolt 38.

In both Figures 1 and 2 the bolt 38 enables the initial spring pressure to be adjusted to suit the line pressure.

I claim:

1. Fluid pressure operated means for actuating a valve comprising a body, a bonnet adapted to be secured to the body, a spindle projecting through said bonnet and adapted to be connected to the valve, an annular dish mounted directly on and secured to said bonnet with its open side facing away from said body, guide means for said spindle extending through said bonnet and into said dish, an annular diaphragm clamped at its outer periphery to the peripheral portion of said dish, common means for clampingly and sealingly securing the inner periphery of said annular diaphragm to the guide means to define a pressure chamber and for fixedly securing said guide means to said bonnet, means for introducing pressure into said chamber, an actuating plate secured to said spindle clear of said guide means and having an annular portion bearing on the free part of said annular diaphragm for movement thereby, and means for urging said spindle in a direction opposite to the urging of said diaphragm.

2. Fluid pressure operated means according to claim 1, in which said last recited means comprises spring means engaged against said plate, and adjustment means for varying the pressure exerted by the spring means.

3. Fluid pressure operated means according to claim 1, in which said guide means comprises a bushing engaged through an opening in said bonnet and having an enlarged end restricting outward movement of the bushing, a spacer sleeve surrounding said bushing and abutting said bonnet, and a nut threaded on said bushing for clampingly securing said inner annular diaphragm periphery to the spacer and securing the bushing from inward movement.

4. Fluid pressure operated means for actuating a valve comprising a body, a bonnet adapted to be secured to the body, a spindle projecting through said bonnet and adapted to be connected to the valve, an annular dish mounted directly on and secured to said bonnet with its open side facing away from said body, guide means for said spindle extending through said bonnet and into said dish, an annular diaphragm clamped at its outer periphery to the peripheral portion of said dish, common means clampingly and sealingly securing the inner periphery of said annular diaphragm in juxtaposition to the central portion of said dish so as to define an annular pressure chamber and for fixedly securing said guide means to said bonnet, means for introducing pressure into said chamber, an actuating plate secured to said spindle clear of said guide means and having an annular portion bearing on the free part of said annular diaphragm for movement thereby, and means located on the side of said actuating plate remote from said spindle and bearing against said plate and urging the valve spindle inwardly with respect to the body.

References Cited in the file of this patent

UNITED STATES PATENTS

| 768,984 | George | Aug. 30, 1904 |
| 1,114,978 | Gamble | Oct. 27, 1914 |
| 2,423,281 | Aspelin | July 1, 1947 |
| 2,496,215 | Jones | Jan. 31, 1950 |

FOREIGN PATENTS

| 6,320 | Great Britain | 1913 |
| 150,102 | Great Britain | Sept. 2, 1920 |